M. M. KELLOGG.
FASTENING DEVICE FOR WAGON END GATES.
APPLICATION FILED AUG. 31, 1915. RENEWED JULY 19, 1918.

1,280,491. Patented Oct. 1, 1918.

Witness
John D. Spalding
John J. McCarthy

Inventor
Milton M. Kellogg.
By Victor J. Evans
Attorney

UNITED STATES PATENT OFFICE.

MILTON M. KELLOGG, OF ELKADER, IOWA.

FASTENING DEVICE FOR WAGON END-GATES.

1,280,491.     Specification of Letters Patent.     Patented Oct. 1, 1918.

Application filed August 31, 1915, Serial No. 48,281. Renewed July 19, 1918. Serial No. 245,771.

*To all whom it may concern:*

Be it known that I, MILTON M. KELLOGG, a citizen of the United States, residing at Elkader, Iowa, have invented new and useful Improvements in Fastening Devices for Wagon End-Gates, of which the following is a specification.

This invention relates to improvements in fastening devices for wagon end gates.

In carrying out the present invention, it is my purpose to provide a fastening device for wagon end gates which may be readily and quickly applied to the wagon to hold the end gate in closed position and removed from the wagon when it is desired to release the end gate, and wherein the component parts will be so arranged and correlated as to reduce the possibility of derangement to a minimum and enable the device to be put into use quickly and conveniently.

With the above and other objects in view, the invention consists in the construction, combination and arrangement of parts hereinafter set forth in and falling within the scope of the claim.

In the accompanying drawing.

Figure 1:
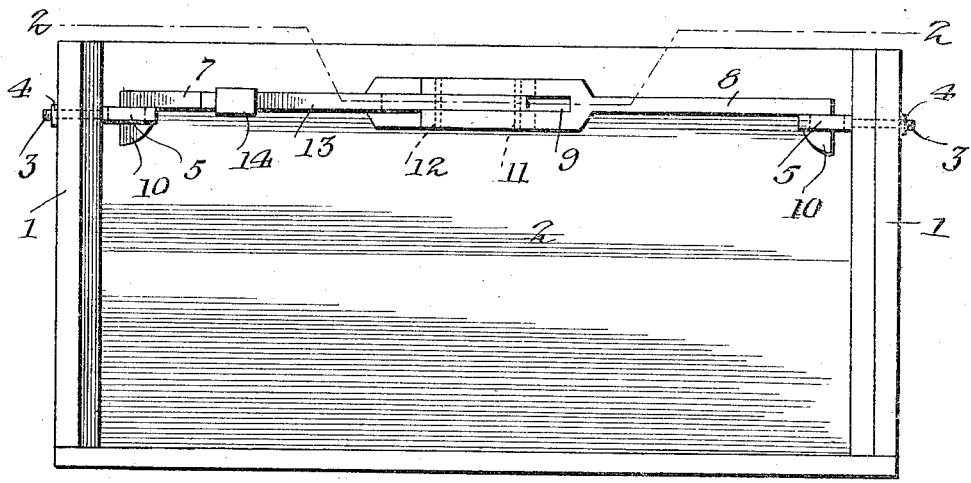
Figure 1 is an end view of a wagon body showing the end gate held in closed position by means of a fastening device constructed in accordance with my present invention.

Referring now to the drawing in detail, 1, 1 designate the rear end portions of the side boards of a wagon body, while 2 designates the end gate adapted to close the rear end of the wagon body.

Passed through horizontally alining openings formed in the rear ends of the side boards 1, 1 are axially alining shanks 3. The outer end of each shank 3 is screwthreaded and threaded on such end is a nut 4, while the inner extremities of the shanks are formed with heads 5 respectively. Formed in each head 5 is a vertical slot 6. 7 and 8 designate companion rods placed end to end and having the adjacent ends thereof bifurcated as at 9 and the outer ends formed with depending hooks 10 respectively adapted to engage in the slots 6 in the heads 5. Disposed within the bifurcated end 9 of the lever 7 is a pivot pin 11, while disposed within the bifurcated end 9 of the rod 8 is a pivot pin 12. 13 designates a lever having one end pivoted upon the pin 11 and the central portion pivotally connected with the pin 12. Slidably mounted upon the rod 7 adjacent to the hook 10 thereon is a locking sleeve 14.

Figure 2:
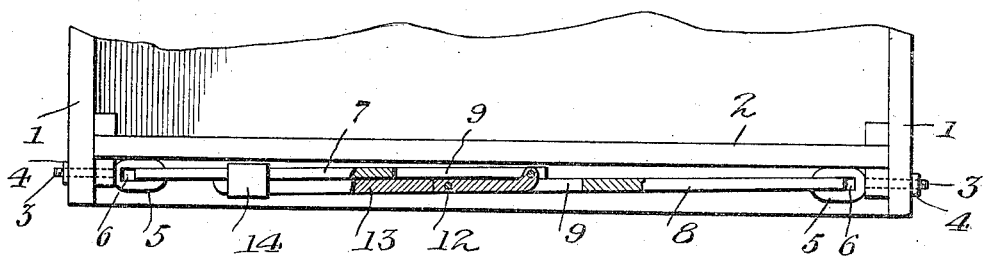
Fig. 2 is a horizontal sectional view on the line 2—2 of Fig. 1.

In practice, the end gate is placed in position to close the rear end of the body, and the adjacent ends of the rods 7 and 8 separated. When the rods 7 and 8 are separated the hooks 10 are dropped into the slots 6 in the heads 5 on the shanks 3 and the lever 13 swung and in the swinging of the lever 13 the bifurcated ends of the rods 7 and 8 are drawn together and overlap, as shown in Fig. 2 of the drawing, and the lever lies in face to face contact with the rod 7. The sleeve 14 is now moved along the rod 7 over the handle end of the lever 13 with the effect to lock such lever against accidental displacement. Thus, the end gate is securely held in closed position.

The slots 6 in the heads 5 are of such length as to permit the rods 7 and 8 to move toward each other in the swinging of the lever 13 and when the lever 13 has been swung to locking position the bills of the hooks 10 engage the lower surfaces of the heads 5, thereby preventing the accidental removal of the rods.

I claim:

A fastening device for wagon end gates, comprising in combination with the end gate and wagon body, retaining members bolted upon the rear ends of the side boards of the wagon body and having their inner opposing heads vertically slotted, rods extending across the end gate and disposed in end to end relation in different vertical planes and in the same horizontal plane, depending hooks formed on the outer ends of said rods and engaging within said slotted heads, the inner ends of said rods being bifurcated, pins extending vertically across the bifurcations in said rods, a horizontally swinging lever pivoted intermediate its ends upon one of said pins and disposed within the bifurcation on one of said rods, an offset end on said lever extending into the bifurcation on the other rod and pivoted upon the other pin, whereby movement of said lever toward the adjacent rod will draw said rods together into overlapping relation, and a locking sleeve slidable upon one of said rods and engageable with said lever to prevent outward movement thereof.

In testimony whereof I affix my signature in presence of two witnesses.

MILTON M. KELLOGG.

Witnesses:
 FRANCIS KELLOGG,
 CHAS. W. NEWBERRY.